United States Patent [19]

DeLigt et al.

[11] 3,960,475

[45] June 1, 1976

[54] ANGULAR INDEXING MECHANISM

[75] Inventors: John DeLigt; Willem A. Nikkel, both of Covington, Va.

[73] Assignee: Westvaco Corporation, New York, N.Y.

[22] Filed: July 8, 1975

[21] Appl. No.: 593,990

[52] U.S. Cl. .................... 425/505; 425/508; 425/143; 425/369; 425/396; 425/336; 425/363; 156/359; 34/121

[51] Int. Cl.$^{2}$ .................... B29C 3/00; B29C 27/00

[58] Field of Search .......... 425/369, 396, 336, 505, 425/508, 363, 143; 156/498, 499, 359, 462

[56] References Cited

UNITED STATES PATENTS

| | | | |
|---|---|---|---|
| 3,004,880 | 10/1961 | Lord | 156/64 |
| 3,492,188 | 1/1970 | Wandel | 425/508 X |
| 3,509,595 | 5/1970 | Mader, Jr. et al. | 425/143 |
| 3,671,361 | 6/1972 | Morrison | 425/369 X |
| 3,692,611 | 9/1972 | Kuhnle | 156/359 X |
| 3,694,927 | 10/1972 | Sorenson | 34/121 |
| 3,829,338 | 8/1974 | Hayasi et al. | 156/359 X |

*Primary Examiner*—Robert L. Spicer, Jr.
*Attorney, Agent, or Firm*—W. Allen Marcontell; Richard L. Schmalz

[57] ABSTRACT

The angular position of a wrap control roll about a paper web preheating roll is remotely adjusted to any one of a plurality of predetermined set positions by an index control over the adjustment power train. The index conrol comprises a remote positioned, console mounted rotary switch having contact positions corresponding to the predetermined wrap control roll set positions. Cooperative switches mounted in an adjustment drive follower mechanism continue the circuit continuity to a solenoid activated drive motor reversing switch. A breaker unit within the follower mechanism is directly driven by the adjustment power train to open the motor switch when the breaker unit is correctly aligned with the desired set position.

12 Claims, 4 Drawing Figures

ANGULAR INDEXING MECHANISM

BACKGROUND OF THE INVENTION

1. Field Of The Invention

Figure 1:
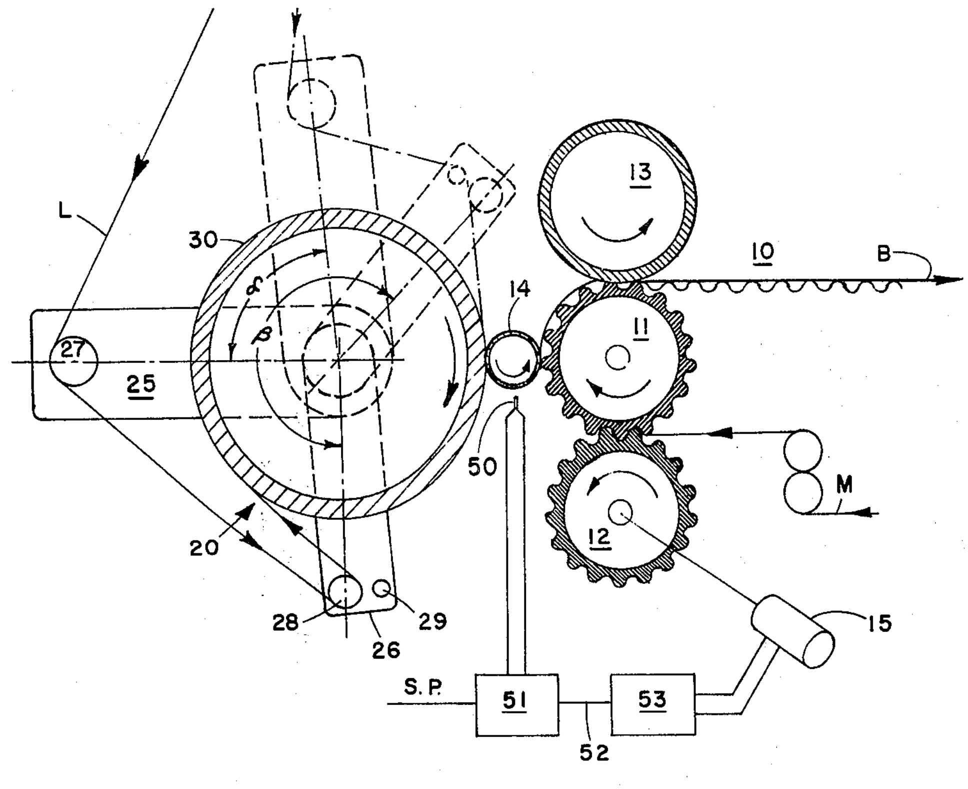

The present invention relates to an apparatus for converting paper webs to corrugated board. Specifically, the present invention relates to an apparatus for controlling the degree of wrap a web is permitted about a preheating cylinder.

2. Description Of The Prior Art.

In the fabrication of corrugated board from paper webs, it may be desirable to heat one or more of the constituent webs to a predetermined temperature prior to bonding or corrugating.

There are several reasons for web preheating such as that disclosed by K. B. Lord in U.S. Pat. No. 3,004,880 for curl correction and that disclosed by W. P. Sorenson in U.S. Pat. No. 3,694,927 for adhesive cure acceleration. Another reason may be to plasticize a polymer plastic coating on a paper wed for fusion bonding a liner with a corrugated medium web.

In any case, however, it is necessary to set the wrap control rollers to a desired, predetermined position about the preheating cylinder. Such predetermined positionment must be variable over a relatively large arc about the heating cylinder to gain the maximum heating surface over a minimum diameter cylinder. Such large spans of adjustment are necessary due to widely varying operating conditions such as speed, ambient temperature, moisture content of the paper web and melting properties of a plastic laminae.

For reasons of operator convenience and safety, it is also desirable that such wrap control rollers be set from a control station remote from the operating machinery.

Although remote index control over wrap control roll positionment about a preheating cylinder is known to prior art as evidenced by the U.S. Pat. discloure of K. B. Lord, supra, it is an objective of this invention to disclose a remote indexing control that responds at a predetermined rate in directly seeking correspondence with a select angular setting.

Another object of the present invention is to teach the construction of a remote controlled, powered indexing mechanism that is operative over a major circular arc less than 360°.

Another objective of the invention is to teach an index control mechanism that neither requires a distinct, operator instruction to reverse the drive power thereof nor requires the wrap control roller to traverse the full circumference of the preheating cylinder to reach the desired set position.

A still further object of the present invention is to teach an index control mechanism whereby the wrap control roller traverses only the smallest included angle between the starting position and a new setting position regardless of the rotational direction that needs to be taken to reach such new setting position.

SUMMARY OF THE INVENTION

These and other objectives to be subsequently made apparent are accomplished by the present invention wherein a rotary selector switch is remotely positioned at an operator station. The contact stylus of the rotary switch is set at a contact position to correspond with the desired angular position of a wrap control roller. For each available index position over the full adjustment arc, a switch is provided on a drive follower mechanism. All such switches are normally closed and therefore conduct current through any circuit completed by the rotary switch until interrupted by a rotating breaker element.

The rotating breaker element is directly driven from the same power train the drives and positions the wrap control roll and may be at the same rotational ratio. Accordingly, there may be a direct, one to one, relative orientation between the breaker element and the wrap control roll. Therefore, when a switch circuit corresponding to a selected roll position is completed, a normally open, polarity reversing, motor drive switch is closed in the appropriate drive direction. The wrap control motor responds accordingly to change the wrap control roll position and in the process thereof, changes the angular position of the drive-follower breaker element relative to the stationary, follower switches. When the breaker element aligns with the particular follower switch which carries circuit continuity to the motor drive switch, the follower switch is opened to open the motor drive switch and stop the drive motor at the predetermined position.

When the predetermined position is reached, all control circuits are returned to a stable, non-energized condition where they remain until the selector switch stylus is moved to another contact position.

BRIEF DESCRIPTION OF THE PREFERRED EMBODIMENT

The present invention is directed particularly to the fabrication of corrugated board from polymer plastic coated paper web. Since the coating of either or both faces of a 0.008 to 0.010 inch (0.2032mm to 0.254mm) thickness paper web with a 0.001 to 0.00075 inch (25.4$\mu$ m to 19.05$\mu$ m) surface laminae of a polymer plastic such as polyethylene, polybutylene, butyl rubber, polyisobutylene, polyvinlbutyral, polymethylmethacrylate, polyvinlchloride and polyamides is well known to those of ordinary skill in the art, no further attention will be paid to those processes whereby such laminated webs are formed. However, it should be understood that the present invention also has utility in the fabrication of uncoated paper web for otherwise conventional corrugating processes.

Relative to FIG. 1, there is shown a single-face corrugating station 10 comprising two, hollow corrugating rolls 11 and 12 and a hollow pressure roll 13.

Unconventional about the present single facer, is the use of hot water flow through the interior chambers of corrugating rolls 11 and 12 in lieu of steam.

Pressure roll 13 serves as a heat absorptive, chill roll and therefore, is provided with cold water circulation through the interior chamber thereof in lieu of conventional steam circulation.

Fusion roll 14 is hollow for the circulation of hot water therethrough.

Figure 2:
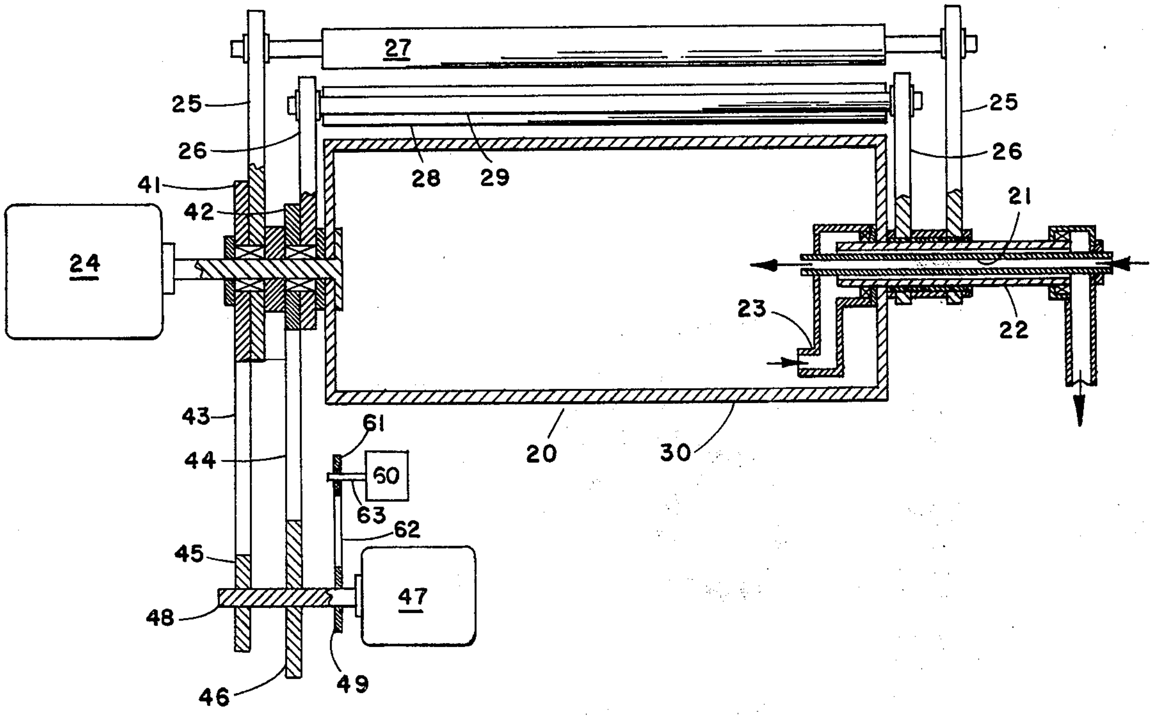

Heater roll 20 is of relatively large diameter, approximately 36 inch diameter (385mm) and is hollow, as seen from FIG. 2, for the circulation of steam therethrough. Concentric steam circulation conduits 21 and 22 are provided for this purpose. Conduit 22 is provided with a drop-leg 23 for condensate pickup.

The surface 30 of heater roll 20 is coated with a high temperature polymer plastic such as Teflon to prevent subsequent sticking of the polymer web coating to the heater roll surface 30.

Heater roll 20 is mounted for rotation about the axis thereof. Rotary power for driving it may be by transmission links, not shown, from the corrugator roll drive motor 14 or directly from an independent drive motor 24.

Mounted by radius arms 25 and 26, respectively, are wrap control rolls 27 and 28. Radius arms 26 also carry a third wrap control roll 29.

Outer and inner wrap control units respective to radius arms 25 and 26 are selectively positionable about the heater roll axis between the maximum wrap position illustrated in FIG. 1 with solid lines and a minimum wrap position illustrated by broken lines.

Angle $\alpha$ designates the included angle about the axis of roll 20 between the maximum and minimum wrap positions for the outer wrap control roll 27.

Angle $\beta$ designates the included angle between maximum and minimum wrap positions of the inner wrap control roll 28.

The maximum and minimum wrap positions of inner wrap control roll 28 are determined by the maximum and minimum lengths of time required by the liner L in contact with the surface 30 of roll 20 to plasticize the polymer surface laminae of liner L contiguous with the roll surface 30. Such time periods will, of course, vary with the rotational speed of the roll 20 and the inlet steam temperature.

The maximum and minimum wrap positions of outer wrap control roll 27 are dependent first, on the maximum and minimum positions of inner roll 28 and second, on the approach path of web L from a supply reel not shown. In any case, it is necessary to control the routing of the web L over the entire positionment range of inner wrap control roll 28 so that no interference may occur.

Pursuant to these criteria, a fixed ratio between angles $\alpha$ and $\beta$ may be determined and the two wrap control units positively coordinated by suitable power transmission links such as sprockets 41 and 42.

Sprocket 41 is non-rotatively secured to radius arm 25 and sprocket 42 is secured to radius arm 26. Roller chains 43 and 44 transmit control movement from respective driver sprockets 45 and 46. Both driver sprockets are non-rotatively secured to the output shaft 48 of wrap control motor. 47.

The ratios between sprockets 41–45 and 42–46 are selected to yield the desired ratio between angles $\alpha$ and $\beta$ relative to rotation of the common power shaft from motor 47.

In operation, the degree of wrap contact between the liner web L and heater roll surface 30 is manually determined and set pursuant to a multiplicity of immediately relevant criteria. Accordingly, the wrap control motor is manually regulated to set the desired position for inner wrap control roll 28.

Figure 3:
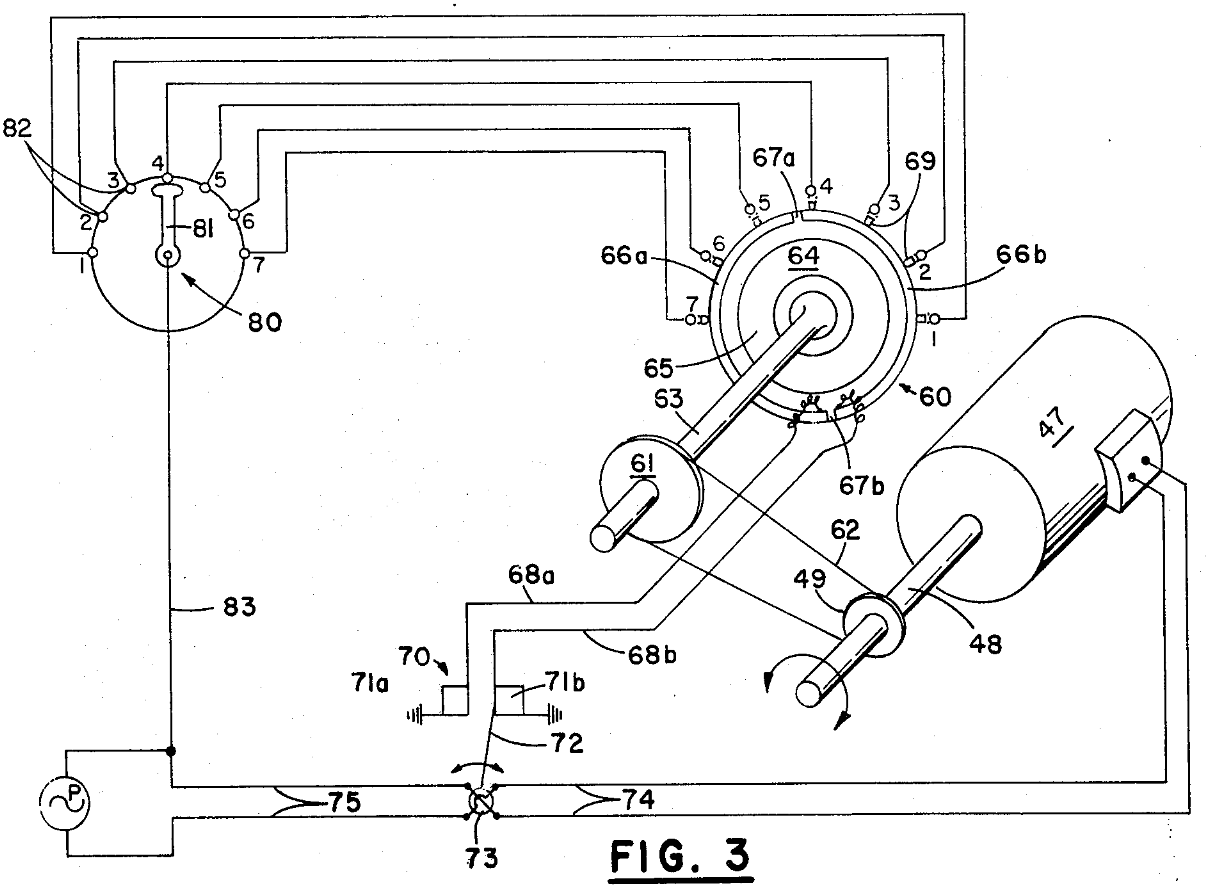

Relative to FIGS. 2 and 3, it is seen that the wrap control motor shaft 48 is provided with a third driving sprocket 49 from which sprocket 61 is driven by roller chain 62. Sprocket 61 is non-rotatively secured to a drive follower shaft 63.

Within the drive follower unit 60, is a breaker unit 64 (FIG. 3) non-rotatively secured to the follower shaft 63.

Breaker unit 64 of the FIG. 3 embodiment comprises a non-conductive disc 65 having two, semi-circular conductor strips 66*a* and 66*b* secured to the outer periphery thereof. Each conductor strip 66 is less than 180° of arcuate length thereby having non-conductive gaps 67*a* and 67*b* therebetween.

Electrical current conduits 68*a* and 68*b* interconnect the conductor strips 66 with the solenoids 71*a* and 71*b* of a normally (non-energized) open, polarity reversing switch 70.

Within a stationary housing portion, not shown, of drive follower unit 60, are a number of electrical brush contacts 69 distributed around the unit axis at the same arcuate degree spacing as an equal number of follower roll 28 set positions around roll 20. By using a drive ratio other than 1:1 between sprockets 49 and 61, however, the arc spacing between adjacent brush contacts 69 may be altered by a proportionality suitable to bring the breaker gap 67*a* into alignment with the appropriate brush contact at the same moment that wrap control roll 28 arrives at a corresponding position around roll 20. If a wrap control roller angle of adjustment $\beta$ is greater than 180°, a proportionality ratio of greater than 1:1 will be required of the FIG. 3 drive follower embodiment to position the brush contacts 69 within a 180°arc. This is necessary due to the fact that conductor strip 66 must be less than 180° of arcuate length.

Selector switch 80 is preferably mounted on a control console remotely located from the heater roll 20 but within sight thereof. This rotary type switch 80 comprises a manually positioned, current conductive stylus 81 which may be rotated into alignment with any of stationary contacts 82 to complete an electric circuit between power conductor 83 and a select one of the roll position circuits 1–7.

Although FIG. 3 illustrates the selector switch stationary contacts 82 in identical angular alignment with corresponding contacts 69 on the drive follower, this in not a necessity. Stationary contacts 82 may be angularly positioned about the stylus 81 rotary axis to correspond with the set positions of wrap control roll 28.

Operatively, when the corrugating machine operator determines that running conditions are appropriate for a wrap control roll position corresponding with position 4 on the selector switch 80, the rotary stylus 81 is aligned therewith. This action completes an electric circuit from the power source P to the corresponding brush contact 69 on the drive follower 60.

Depending on the prior positionment of the wrap control roller 28, current will be conducted from the No. 4 brush 69 through one of conductor strips 66*a* or 66*b*. As illustrated, continuity is completed through conductor strip 66*b*. Depending on which conductor strip, 66*a* or 66*b*, carries the circuit, the direction of reversible motor 47 is dictated. Since, in this case, conductance is through strip 66*b*, conduit 68*b* completes the circuit to solenoid 71*b* of switch 70. This action strokes the crank arm 72 to align the switch contacts 73 connecting power conduits 74 on the motor 47 with those conduits 75 on the power P side. Motor 47 is thereby started and maintained in the proper running direction to drive the roll 27 and 28 positioning sprockets 41–45 and 42–46. Simultaneously, breaker element 65 is rotated through sprocket transmission 49–61 until non-conductive gap 67*a* aligns with the No. 4 brush on the drive follower 60.

Upon alignment of the non-conductive gap 67*a* with the No. 4 brush, electrical continuity between the power source P and the solenoid 71*b* is broken thereby releasing switch crank arm 72 for return to a neutral, non-energized position whereat the contacts 73 between the motor 47 and power source P are opened. Consequently, motor 47 stops at this position.

A brake mechanism, not shown, integral with the motor 47, holds all rotative element of the transmission securely in the position whereat the motor stops. Such brake mechanisms are normally (non-energized) biased to the lock position and drive energy to the motor also actuates the brake release mechanism. Such integral motor-brakes are well known to the prior art.

Figure 4:
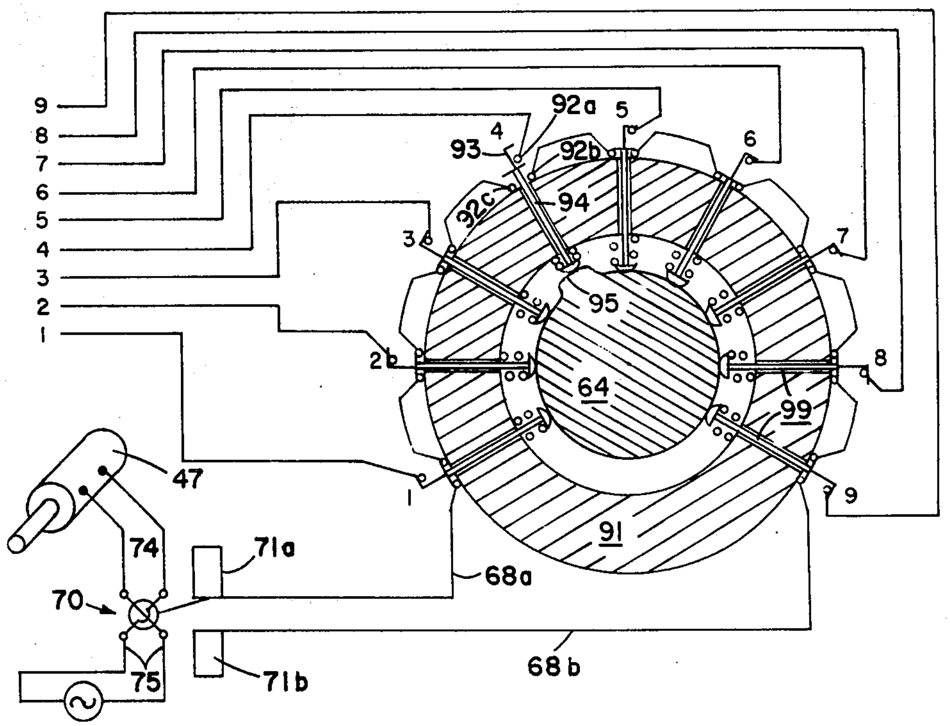

The driver follower embodiment of FIG. 4 is not limited to the 180° switch distribution about the breaker unit 64 axis. Accordingly, this embodiment may utilize a 1:1 drive ratio between switch positions and corresponding wrap control roll 28 set positions notwithstanding a greater then 180° acruate distribution of such roll set positions.

In this embodiment, normally closed, spring loaded limit switches 99 are secured through the drive follower housing 91. Each limit switch 99 has 3 stationary contacts 92*a*, 92*b* and 92*c*. In the normally closed position, all 3 contacts 92*a*, 92*b* and 92*c* are connected by a contact bar 93 secured to a push rod 94. Outer contact 92*a* is connected to a corresponding rotary selector switch 80 contact. From limit switch No. 5 corresponding to mid-range position for wrap control roll 28, inner contacts 92*c* and 92*b* connect adjacent limit switches 99 counter-clockwise therefrom in series to the solenoid conductor 68*a*. Similarly, clockwise adjacent switches from No. 5 are connected in series to the solenoid conductor 68*b*.

Cam lobe 95 is positioned on breaker unit 64 to open contacts 92*a*, 92*b* and 92*c* upon alignment with a push rod 94. Consequently, if a circuit continuity is completed by the selectro switch stylus 81, current will blow across all switches 99 in the direction, clockwise or counter-clockwise, appropriate for movement of the breaker unit 64 toward the corresponding conductive switch.

In the FIG. 4 illustration, if cam lobe 95 had been previously aligned with the No. 7 limit switch 99, alignment of the selector switch with the No. 4 position would have completed a circuit continuity through contact 92*a*, contact bar 93, and contact 92*c* of the No. 4 switch 99. This continuity would be continued across the No. 1, 2 and 3 switches to solenoid 71*a*. Since the cam lobe 95 is of such arcuate length as to assure the open, non-conductive condition of at least one switch 99 proximate thereof, no conduction is permitted in the clockwise direction to solenoid 71*b*. Accordingly, motor 47 will be energized to drive the cam lobe 95 from the starting, No. 7, switch position toward the newly desired, No. 4, switch position. Upon alignment therewith, cam lobe 95 will stroke the No. 4 push rod to break the continuity between contact 92*a* and conductor bar 93 of the No. 4 position.

Speed of the single facer, and hence, speed of the heater roll 20, is regulated by automatic control over motors 14 and 24. Such speed control is responsive to a temperature sensing device such s themocouple 50 which generates an electrical signal proportional to the temperature of the bonding face of liner web L as it passes around the fusion roll 14. These signals are received by a comparison device 51 well known in the electric control art and compared to upper and lower set-point signals SP. Any differences between the thermocouple signal and the set-point signal will be transmitted to motor controller 53 as an error signal 52. Depending on the magnitude and polarity of error signal 52, the rotational speed of single facer 10 and heater roll 20 will be approximately adjusted to bring the liner web L temperature at the fusion roll 14 back within the desired tolerance range.

Collectively, the corrugating machine control scheme operates as follows. A web of corrugating medium M is received from a supply reel, not shown, and routed into the meshing nip between corrugating rolls 11 and 12. Simultaneously, heat is conductively transferred to the medium M from the hot water source flowing within rolls 11 and 12.

Subsequent to forming, the corrugated continuum of medium M is maintained in contiguous contact with the corrugating roll 11 into the nip with fusion roll 14 where the plasticized surface of liner web L is pressed into bonding contact with the corrugated flute crests of medium M.

Intimate surface contact between the medium M and the roll 11 is continued into the nip with the pressure roll 13 where, under the nip pressure, sufficient heat is withdrawn from the bonded joint between the flute crests of medium M and the liner L to set the joint. Thereafter, the integrated unit of webs M and L constituting single-face board B is withdrawn from the single-facing unit 10 for further processing.

Prior to entry into the fusion nip, liner web L is drawn from a supply reel, not shown, and routed over the outer wrap control roller 27 and around the inner wrap control roller 28. Regardless of the degree of wrap contact with heater roll surface 30 desired, liner web L will always approach the surface 30 at the same angle of tangency, relative to the inner wrap control roll 28.

Depending on the plasticizing temperature of the particular surface laminae on the web L, 210°F(98°C) for a one mil (25.4$\mu$ m) thickness of corona treated polyethylene, for example, and the present steam temperature circulated within heater roll 20, inner wrap control roll 28 is manually set at a desired position around the heater roll 20 circumference by turning the stylus 81 of rotary switch 80 to alignment with the correspondingly desired contact 82.

This action completes an electric circuit through the drive follower to energize the aappropriate polarity reversing switch holding relay 71*a* or 71*b*. Consequently, the desired current polarity is completed to motor 47 which drives both, the wrap control rolls 27 and 28 and the drive follower breaker element. When the wrap contol rolls reach the desired angle, so too, does the breaker element align with the corresponding follower contact thereby breaking the switch 70 holding current. Since the main power contacts 73 of the switch 70 are biased to the open condition the motor 47 stops and the integral brake thereof is engaged.

If corona treatment as described in the July, 1970 Paper, Film and Foil Converter article by A. L. James, is not used, the plasticizing temperature of the laminae will be significantly increased. In the present example, a non-corona treated lamina plasticizing temperature will be in the order of 230°F (110°C).

Known properties of the plastic laminae and running experience will determine the exact temperature range that is to be monitored by the thermocouple 50 control which, in the given example, will be 208° to 212°F (97.8° to 100°C). The desired condition of the plastic is the lowest temperature to yield a tacky, soft result. Higher temperatures induce an out-gassing of the substrate paper contained moisture in the form of steam so as to leave what is known as pin holes in the plastic coating continuity. Such pin holing permits subsequent absorption of moisture by the paper substrate which dramatically reduces wet-strength of the corrugated board product.

Having selected a set position for the inner wrap control roller 28, thermocouple 50 thereafter regulates the speed of both, the corrugating rolls 11, 12 and the heater roll 20 to maintain the desired temperature of the bonding face of liner L.

The preferred embodiment of my invention being fully described herein, I claim:

1. In combination with a single-face corrugating machine comprising a pair of corrugating rolls, a web heating roll, a fusion roll running simultaneously in nip relation with said heating roll and flute crests on said corrugating rolls, said heating roll having an axis of rotation and a wrap control roll rotatably secured to the distal end of a pair of radius arms rotatably mounted about said heating roll axis, said wrap control roll being angularly positioned about said heating roll axis by rotational power transmission means, the improvement comprising:

A. Electric motor means for driving said transmission means; and

B. Motor control means for regulating the operation of said motor means to set said wrap control roll at a desired one of a predetermined number of arcuately spaced set positions about said heating roll axis over an adjustment arc of less than 360°, said motor control means comprising a rotary selector switch means, drive follower means, and polarity reversing switch means for controlling the flow of electric drive energy from a supply source to said motor means, said rotary selector switch means having a number of first stationary contacts corresponding to the predetermined number of control roll set positions and a rotary contact means for selectively connecting said energy source to one of said first stationary contacts, said drive follower means having a number of second stationary contact units corresponding to said number of control roll set positions, said second stationary contact units being positioned about a follower means axis by an arcuate spacing proportional to the arcuate spacing between respective control roll set positions, energy flow circuit continuity means between said second stationary contact units and respective polarity reversing elements of said reversing switch means, breaker element means rotatable about said follower means axis for interrupting energy flow continuity between at least one of said second stationary contact units and said polarity reversing elements and drive follower transmission means driven by said power transmission means to rotate said breaker element at an angular displacement rate proportional to the angular displacement rate of said control roll for interrupting the circuit continuity of a second stationary contact unit respective to the positional alignment of said control roll with a respective one of said predetermined set positions.

2. A machine as described by claim 1 wherein said second stationary contact units are electrical brushes biased to normal connection with said flow circuit continuity means, said continuity means comprising two conductor strip means secured to said driver follower transmission means, each strip means extending less than 180° of arc about said drive follower axis within a common plane perpendicular to said follower axis, said breaker means comprising non-conductive gaps separating the arcs of said strip means.

3. A machine as described by claim 2 wherein said reversing switch means is normally open to interrupt energy flow to said motor means when said polarity reversing elements are not energized, said reversing elements comprising solenoid means, each of said strip means being connected to said solenoid means to actuate said reversing switch means to a respective polarity conducting condition when an energy flow condition is completed between one of said brushes and a respective strip means in contact therewith to drive said motor means in an angular direction whereby one of said non-conductive gaps is rotated toward said one brush.

4. A machine as described by claim 1 wherein said second stationary contact units each comprise two contact points normally connected by a movable conductor, said first stationary contacts being connected to respective movable conductors, said continuity means comprising energy conductors between contact points of angularly adjacent contact units and one contact point respective to second stationary contact units corresponding to opposite extreme set positions of said control roll within said adjustment arc said one contact points being conductively connected to said polarity reversing switch means.

5. A machine as described by claim 4 wherein said breaker means comprises a cam lobe element rotatively driven by said follower transmission means, said cam element engaging at least one of said movable conductors to disconnect the respective two contact points each from the other and from the respective first stationary contact.

6. A machine as described by claim 5 wherein said reversing switch means is normally open to interrupt energy flow to said motor means when said polarity reversing elements are not energized, said reversing elements comprising solenoid means, each of said one contact points connected to said reversing switch means being connected to said solenoid means to actuate said reversing switch means to a respective polarity conducting condition when an energy flow condition is completed through a selected one of said first stationary contacts, a corresponding one of said stationary contact unit movable conductors, said continuity means and one extreme set position contact point disposed on the opposite arcuate side of said corresponding second stationary contact unit from the location of said cam element.

7. An apparatus for angularly positioning a machine element about an axis of rotation, said apparatus having journaled mounts for said machine element secured for rotation about said axis of rotation, rotative power means for driving said mounts between a plurality of angular set positions distributed about said axis within an adjustment arc of less than 360° including first transmission means interconnecting said power means with said mounts, the improvement comprising:

A. Rotary switch means having a plurality of first stationary contacts, each contact corresponding to a predetermined set position of said machine element about said axis within said adjustment arc, and a manually positionable rotary contact for selectively connecting each stationary contact with an electric energy source;

B. Drive follower means having a number of normally closed, second stationary contact units corresponding to the number of said first stationary contacts and respective electrical connection therebetween, said second stationary contacts being distributed about a breaker means rotational axis by an angular separation proportional to an angular separation between said plurality of machine element set positions, said drive follower means also comprising electric circuit continuity means between said second stationary contacts and polarity reversing motor switch actuating means, and rotating breaker means positioned adjacent to said second stationary contacts and comprising continuity interrupting means for interrupting circuit continuity between at least one of said second stationary contacts and said motor switch actuating means; and, C. Second transmission means between said rotative power means and said breaker means having a drive proportionality between a predetermined set position of said machine element and the alignment of said continuity interrupting means with a corresponding second stationary contact whereby electric energy conducted from said source through said rotary contact and a select one of said first stationary contacts is further conducted through a corresponding one of said second stationary contacts and said continuity means to energize said motor switch actuating means to an energy conducting position between an energy source and said power means until said interrupting means is driven to alignment with said one corresponding second stationary contact.

8. An apparatus as described by claim 7 wherein said second stationary contact units are electrical brushes biased to normal connection with said circuit continuity means, said circuit continuity means comprising two conductor strip means secured to said rotating breaker means, each strip means extending less than 180° of arc about said rotational axis within a common plane perpendicular to said rotational axis, said continuity interrupting means comprising non-conductive gaps separating the strip arcs of said strip means.

9. An apparatus as described by claim 8 wherein said motor switch actuating means operates normally open, reversing switch means connected between said electric energy source and said power means, said reversing switch means having an open, non-conductive position when said actuating means is not energized, said actuating means comprising solenoid means, each of said strip means being connected to said solenoid means to actuate said reversing switch means to a respective polarity conducting position when an energy flow condition is completed between one of said brushes and a respective strip means in contact therewith to drive said power means in angular direction whereby one of said non-conductive gaps is rotated toward said one brush.

10. An apparatus as described by claim 7 wherein said second stationary contact units each comprise two contact points normally connected by a movable conductor, said first stationary contacts being connected to respective movable conductors, said continuity means comprising energy conductors between contact points of angulary adjacent contact units and one contact point respective to second stationary contact units corresponding to opposite extreme set positions of said machine element within said adjustment arc being conductively connected to said polarity reversing switch means.

11. An apparatus as described by claim 10 wherein said rotating breaker means comprises a cam lobe element rotatively driven by said second transmission means, said cam element engaging at least one of said movable conductors to disconnect the respective two contact points each from the other and from the respective first stationary contact.

12. An apparatus as described by claim 11 comprising reversing switch means in an energy conductive conduit between said energy source and said power means, said reversing switch means being operated by said motor switch actuating means and having a normally open position to interrupt energy flow to said power means when said actuating means is not energized, said actuating means comprising solenoid means, each of said one contact points connected to said reversing switch means being connected to said solenoid means to actuate said reversing switch means to a respective polarity conducting condition when an energy flow condition is completed through a selected one of said first stationary contacts, a corresponding one of said second stationary contact unit movable conductors, said continuity means, and one extreme set position contact point disposed on the opposite arcuate side of said corresponding second stationary contact unit from the location of said cam element.

* * * * *